(12) United States Patent
Beer

(10) Patent No.: US 9,791,256 B1
(45) Date of Patent: Oct. 17, 2017

(54) STEP SHIM

(71) Applicant: William Beer, Catonsville, MD (US)

(72) Inventor: William Beer, Catonsville, MD (US)

( * ) Notice: Subject to any disclaimer, the term of this patent is extended or adjusted under 35 U.S.C. 154(b) by 0 days.

(21) Appl. No.: 15/141,329

(22) Filed: Apr. 28, 2016

(51) Int. Cl.
*E04F 21/00* (2006.01)
*G01B 5/25* (2006.01)
*G01B 3/46* (2006.01)
*E06B 1/60* (2006.01)

(52) U.S. Cl.
CPC ............ *G01B 5/25* (2013.01); *E04F 21/0007* (2013.01); *E06B 1/6069* (2013.01); *G01B 3/46* (2013.01)

(58) Field of Classification Search
CPC .................. E06B 1/6069; G01B 3/46
USPC .............. 33/481, 501.45, 567; 52/98, 126.1; 428/43, 179
See application file for complete search history.

(56) References Cited

U.S. PATENT DOCUMENTS

| | | | | |
|---|---|---|---|---|
| 2,536,401 A * | 1/1951 | Victor | ....................... | G01B 3/30 33/567 |
| 3,041,735 A * | 7/1962 | Allen | ....................... | G01B 3/30 33/517 |
| 3,104,473 A * | 9/1963 | Rose | .................. | E05D 11/0009 24/563 |
| 3,229,323 A * | 1/1966 | Hensgen | .................... | E05D 7/04 16/247 |
| 4,232,068 A | 11/1980 | Hoh | | |
| 4,336,879 A * | 6/1982 | Carr | ......................... | B27M 3/02 206/323 |
| 4,526,641 A * | 7/1985 | Schriever | ................ | B29C 65/76 156/247 |
| 5,163,255 A | 11/1992 | Gamba | | |
| 5,815,992 A * | 10/1998 | Wells | ................... | E04B 1/34352 248/188.2 |
| 5,853,838 A | 12/1998 | Siems et al. | | |
| 6,230,446 B1 | 5/2001 | Chalich | | |
| 6,862,815 B1 * | 3/2005 | Blouch | ..................... | G01B 3/30 33/562 |
| 7,108,901 B2 | 9/2006 | Traub et al. | | |
| 8,813,437 B1 | 8/2014 | Spofford | | |
| 9,097,506 B2 * | 8/2015 | Shapiro | ..................... | G01B 3/04 |
| 2007/0166498 A1 * | 7/2007 | Penar | .................... | E06B 1/6069 428/40.1 |

(Continued)

FOREIGN PATENT DOCUMENTS

FR    EP 0403397 A1 * 12/1990 ........... E06B 1/6069
GB    2078328 A * 1/1982 ........... E06B 1/6069

*Primary Examiner* — Christopher Fulton
(74) *Attorney, Agent, or Firm* — Larry J. Guffey, Esq.; Pamela K. Riewerts, Esq.; Oliver & Grimsley, LLC

(57) ABSTRACT

A "step shim" for positioning a fixture in a precise location relative to an adjoining support structure includes an elongated member having: (a) two, side surfaces, (b) a flat, bottom face, (c) a top face that includes a plurality of flat, adjoining segments, each of which is separated from an adjoining top face segment by a boundary line that extends across the top face (d) front and back ends, and (e) wherein this member has a configuration adapted to allow it to be broken apart along the member's boundary lines into a plurality of member segments that each correspond to one of the top face segments, and (f) wherein the distance between the bottom face and the segment of the above top face defines a member segment's height, each of which is progressively taller from the member's front to back end.

11 Claims, 3 Drawing Sheets

(56) References Cited

U.S. PATENT DOCUMENTS

2009/0044463 A1* 2/2009 Moscone .............. E06B 1/6069
  52/126.1
2009/0246440 A1* 10/2009 Eagle ................... E06B 1/6069
  428/43

* cited by examiner

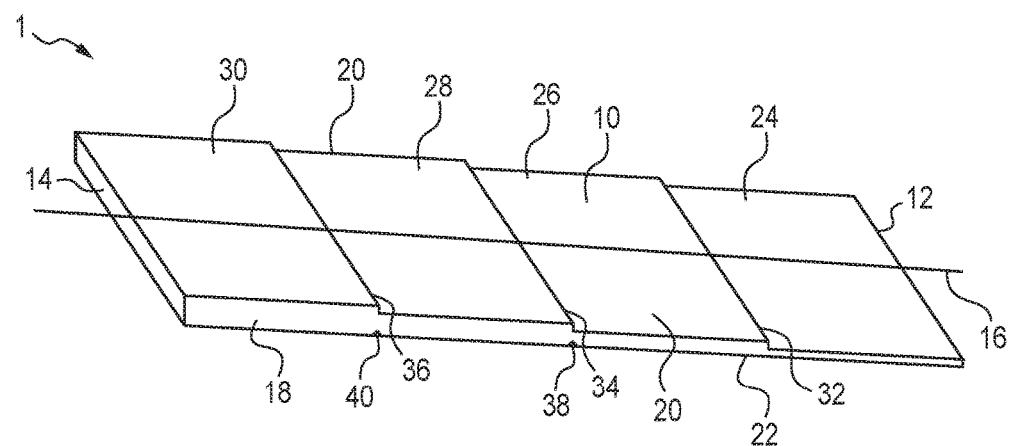
FIG. 1
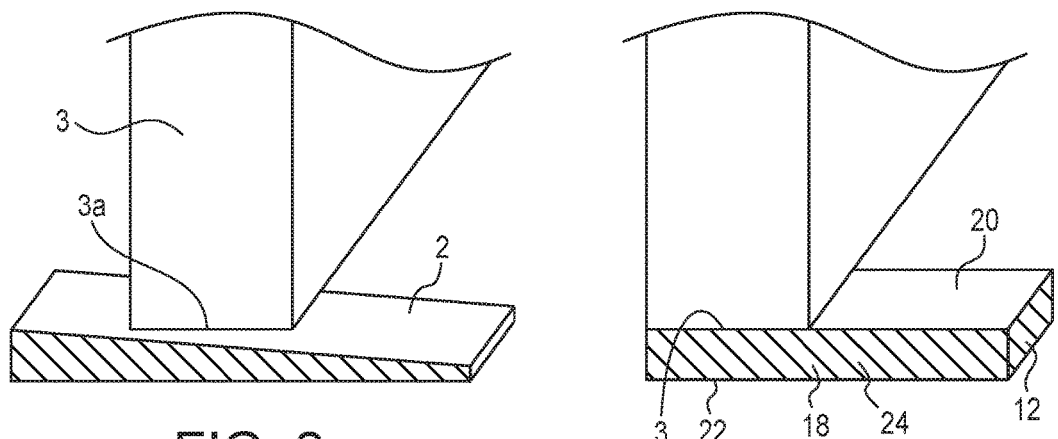
FIG. 2
(PRIOR ART)
FIG. 3

STEP SHIM

BACKGROUND OF THE INVENTION

1. Field of the Invention

The present invention generally relates to stock materials or static structures that are weakened to permit separation, and specifically, to a "step shim" for assorted shimming applications.

2. Description of the Related Art

In the construction industry, during the installation of fixtures such as windows, doors, cabinets and the like, it is usually desired that the fixtures be installed in a level or vertical and square position. To accomplish this, a leveling shim or spacer is usually placed in the gap that exists between, for example, a truly vertical fixture (e.g., a door jam) and the non-vertical, surrounding support structure (e.g., at a height of 80" above the intersection point of the support structure and the underlying floor, the support structure is ¼" to the left of where it needs to be in order for it to be truly vertical). The purpose of the shim is to hold the fixture in its desired vertical orientation prior to the fixture being adhered to the support structure and to subsequently (i.e., once the fixture is adhered to the support structure) possibly act as a load bearing member to keep the fixture in its desired orientation.

In the past it had been necessary for the construction worker to fabricate the shim or spacer on the construction site from scrap materials available. A common source of such scrap materials was wooden shingles or shakes used for siding or roofing.

Such leveling shims or spacers are today commercially available items in most building supply type stores. The most commonly incurred types of these shims have, from a side view, a wedge shaped configuration in which the two straight lines that are seen as the edges of the top and bottom faces of the shim diverge from effectively a single point which, for the purpose of this discussion, we'll identify as the front or point end of the shim. These diverging lines continue to spread apart until the distance or height between them at the back end of the shim is a set amount, typically ¼" and with the back end of the shim, as measured along the shim's longitudinal centerline, being 12" from the shim's front end. We refer to such a shim as a ¼"×12" length, wedge shim.

To use a wedge shim in the application mentioned above (i.e., squaring up a door jam), at any desired point along the gap between the top and bottom of the door jam, one just pushes the shim's front end into the gap in such a manner that the shim's centerline goes into the gap perpendicular to the gap's leading edge. Once the shim becomes wedged or stuck in the gap and can go no further inward, one uses a knife or razor cutter to score (i.e., make an indentation into the top surface of the shim that will serve as a fault line along which the shim will break if its back end is folded forward toward the gap) the shim's top surface and then bends the shim so as to break it along its score line so that the exposed part of the shim can be removed and discarded. Depending upon the height or width of the gap at the point where the shim is inserted, the shim's front end will extend into the gap a proportional distance (e.g., for a ¼"×12" wedge shim and a ¹⁄₁₆" gap height, the shim's front end will extend approximately 3" perpendicularly into the gap and, after the scoring and breaking, result in 9" of the shim being discarded).

This variation of how far into the gap a wedge shim will extend can be problematic. For example and in the situation where ¼"×12" wedge shims are being used, if the structure to be leveled or made vertical is not that wider than 12", the situation can occur where the free end of the shim extends totally under and then beyond the opposite side of the structure (e.g., if the structure is 6" wide and the gap ³⁄₈" high, a ¼"×12" wedge shim will extend 3" beyond the opposite side of the structure). This causes yet more work for the fabricator, since he will now also have to score the extending top face of the shim and break off and discard this extending portion.

Another problem with the use of such ¼"×12" wedge shims can occur when the high of the gap is greater then ¼". This situation will require the use of at least three shims. For example, for a ³⁄₈" gap height, two shims will be placed one on to of the other so that their front ends face away from each other so as to created a ¼" height spacer. The final required ⅛" of gap height is shimmed with the third shim that will extend 6" into the gap. The use of three or more shims for such larger gap heights can quickly result in excessive numbers of ¼"×12" wedge shims being required to shim a fixture to a structure that has such larger or wider gaps.

To reduce the workload required to level, make vertical or shim a fixture, and to reduce the number of shims required to be used in such tasks, an improved shim or method of shimming is needed.

SUMMARY OF THE INVENTION

Recognizing the need for an improved shim or method of shimming, the present invention is generally directed to providing such an improved shim.

In a preferred embodiment, the present invention is a "step shim" for positioning a fixture or body in a precise location (e.g., horizontal or vertical) relative to an adjoining support structure to which the fixture is to be attached or on which the fixture is to sit, such a "step shim" includes an elongated member having: (a) two, side surfaces for which the distance between these side surfaces defines the member's width, (b) a flat, bottom face, (c) a top face that includes a plurality of flat, adjoining segments, each of which is separated from an adjoining top face segment by a boundary line that extends across the top face and wherein, for each of these segments, the perpendicular distance between the bottom face and the segment of the above top face defines a segment's height, (d) front and back ends for which the distance between the ends defines the member's length and wherein the member's longitudinal centerline extends between these ends, (e) wherein this member also has a configuration adapted to allow it to be broken apart along the member's boundary lines into a plurality of member segments that each correspond to one of the top face segments, and (f) wherein the height of any member segment is less than that of the height of the adjoining member segment that is closest to the member's back end and greater than that of the height of the adjoining member segment that is closest to the member's front end.

This preferred embodiment may also include: (g) a plurality of straight line, scoring indents of a prescribed depth into the member's bottom face and wherein each of these scoring indents is located below a boundary line in the member's top face, (h) wherein the member segments each have the same member segment length that is equivalent to a lateral dimension of the adjoining support structure to which the fixture is to be attached.

In a still further preferred embodiment of the present invention, the dimensions of this member include member segment heights in which the shortest to the tallest of these member segments are 1/16" 1/8", 3/16" and 1/4" and with these segments all having the same length of 3.5 inches.

Thus, there has been summarized above (rather broadly and understanding that there are other preferred embodiments which have not been summarized above) the present invention in order that the detailed description that follows may be better understood and appreciated.

BRIEF DESCRIPTION OF THE DRAWINGS

FIG. 1 is a perspective view of the present invention.

FIG. 2 is a perspective view of a prior art, wedge shim being used to trim underneath the bottom of a cabinet.

FIG. 3 is a perspective view of one member segment of the present invention after it has been installed in the same shimming application shown in FIG. 2 and because of its uniform height is seen to contact the cabinet's bottom surface at all points across the full width of the cabinet's vertical member.

DESCRIPTION OF THE PREFERRED EMBODIMENT

Figure 4:
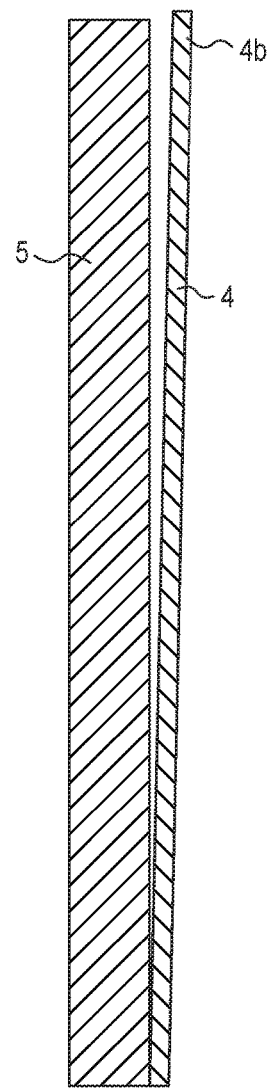
FIG. 4 shows a side view of a typical shimming application where the present invention is intended for use—this situation is that of a door jam that needs to be installed vertically and attached to an adjoining support structure which is a 2×4 stud that is not vertical because, when the bottom of the vertical door jam is touching the bottom of the stud, the top of the stud is 1/4" to the left of where it needs to be in order to be vertical and there is therefore a gap between the door jam and the adjoining 2×4 stud that needs to be shimmed.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention generally relates to a "step shim" for positioning a fixture or body in a precise location (e.g., horizontal or vertical) relative to an adjoining surface or support structure to which the body is to be attached or on which the body is to sit.

FIG. 1 shows a preferred embodiment of the present invention 1. It is seen to consist of an elongated, rectangular member 10 having front 12 and back 14 ends and a longitudinal centerline 16 therebetween and along which the length of the member is defined. It also has two, parallel side surfaces 18, 20 for which the distance between these side surfaces defines the width of the member.

This member is also characterized by having top 20 and bottom 22 faces for which the distance between these faces defines the height or heights of the member. The member's bottom surface is flat except for two V-shaped groves that will be discussed later. Meanwhile, the member's top surface is segmented into four, equal length and flat, rectangular segments 24, 26, 28, 30 by three, boundary lines 32, 34, 36 that extended between the member's side surfaces and are oriented perpendicular to the member's longitudinal centerline and where discrete changes occur in the height between two neighboring segments.

Each of these rectangular segments is characterized by having its own uniform and distinct height. These segments are oriented along the length of the member so that the one having the shortest height includes the front end of the member. The segment behind this front segment has the second or next highest height, the next segment back has the third highest height, and the final segment includes the back end and is the highest or tallest of the segments.

On the member's bottom face are two V-shaped groves 38, 40 that extended between the member's side surfaces and are oriented perpendicular to the member's longitudinal centerline. Each of these groves are parallel to and located below one of the boundary lines 34, 36 that divide the member's three highest segments 26, 28, 30, i.e., grove 38 is below boundary line 34 and grove 40 is below boundary line 36.

The configuration and depth of these groves allows the member to be easily broken apart along these groves into the two highest of the individual rectangular segments 28, 30 by bending the back end of any section upward towards the front end of the same segment. The height of the front segment 24 is such that a V-grove is not needed below the boundary line separating the front and the segment behind it in order to break apart along the boundary line these two smaller height segments. In certain situations, it will also be advisable for an installer or fabricator to score the top surface of the member with a knife or razor cutter along the boundary line where it is desired to separate the member—thus, the V-groove on the bottom surface is meant to reduce, but not always to totally replace the need for some scoring on the member's top face.

In a preferred embodiment, the heights of the shortest to the tallest of these segments are 1/16" 1/8", 3/16" and 1/4" and these segments all have the same length of 3.5." The distance between the side surfaces is in the range of 1"-2.5", with a preferred width of 2." This length dimension is chosen because it specifically adds to the usefulness of the present invention (often referred to herein as a "step shim") for many U.S. building applications that often utilize vertical structural members that have a standard, lateral dimension—more explanation on this point is included below. In other geographic regions with other standard size or dimensioned structural members, the number of segments into which the member may be broken can vary in order to maximize the usefulness of the present invention in these other geographical regions. All such possible number of segments and different segment lengths and heights are consider to be within the scope of the present invention.

To illustrate the enhanced usefulness of the present invention and its unique geometry and dimensions, consider the following installation examples. For the situation where a fixture or kitchen cabinet 3 has been installed level but the support structure 5 or underlying floor is not level so that the gap at the bottom of the cabinet between it and the floor will need to be shimmed, certain shimming challenges are presented—e.g., because the backside of the bottom of the cabinet is in an enclosed space to which the installer does not have full access, this gap can only be shimmed from one side. FIG. 2 shows the result when a standard, wedge shim 2 has been slid under the cabinet's bottom surface 3a. Only a very small portion of this shim's top surface is seen to actually touch the cabinet's bottom surface. FIG. 3 shows the result when a segment of the present invention's "step shim" has been used. The step shim's top surface is seen to fully contact the cabinet's bottom surface—this has the benefit of making for a more stable installation and less chance for the cabinet's bottom surface to eventually move and undermine the levelness of the cabinet that was achieved when the it was initially installed.

A second example of where the present invention works better in a shimming application is that of the situation where fixture or door jam 4 needs to be installed vertically and attached to an adjoining support structure or a 2×4 stud 5 that is not vertical. FIG. 4 shows this situation in a side view that is meant to show the full length of the gap that needs to be shimmed and where the bottom 4a of the vertical door jam is touching the bottom of the stud and, at the top of the door jam, the stud is assumed to be ¼" left of where it needs to be in order to be vertical.

Figure 5A:
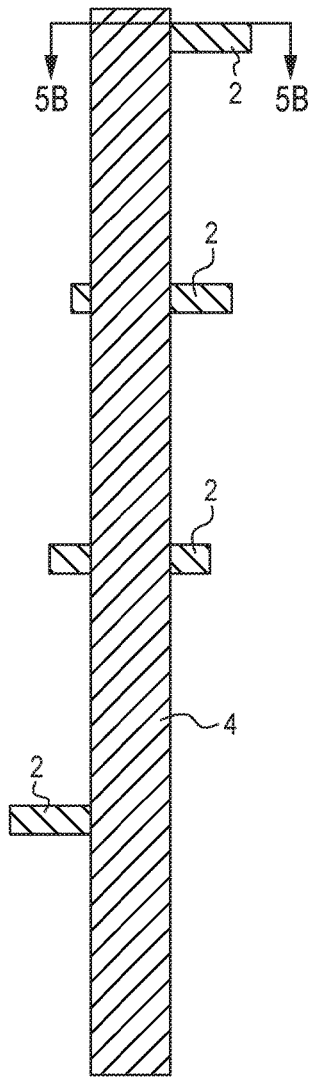
FIG. 5A shows a front view of how four, prior art, 1/4"×12" wedge shims are slid into the gap from the left side, at four different heights up from the floor, to shim the door jam.
Figure 5B:
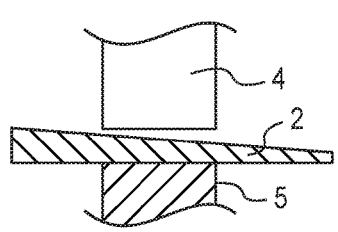
FIG. 5B shows a top view of the shimming arrangement of FIG. 5A and reveals that only a small portion of this shim's top surface actually contacts the door jam; this type of installation is unstable and eventually the door jam may twist and lead to door sticking or other problems.

FIG. 5A, a front view, and FIG. 5B, a top view, show how a single, ¼"×12" wedge shim is being slid into the gap from the left side, at four different heights up from the floor, to shim the door jam. The different distances by which each of these shims extend beyond the right side of the door jam is a relative measure of the depth of the gap at each elevation up from the floor. Thus, at the top of the door jam where the gap is assumed to be ¼", the tallest part of the shim (i.e., its back end) is flush with or inside the left edge of the door jam. Meanwhile, at approximately ¼ of the way up to the top of the door jam where we assume the gap is only about ¹⁄₁₆", most of the shim extends from the left side of the door jam and only a small length of the shim can fit into the gap.

FIG. 5B illustrates the problem with using only one wedge shim where it is desired to shim the gap—i.e., since only a small portion of the shim's top surface actually contacts the door jam, this type of installation is unstable and eventually the door jam may twist or "rack" and lead to door sticking problems, etc.

Figure 6A:
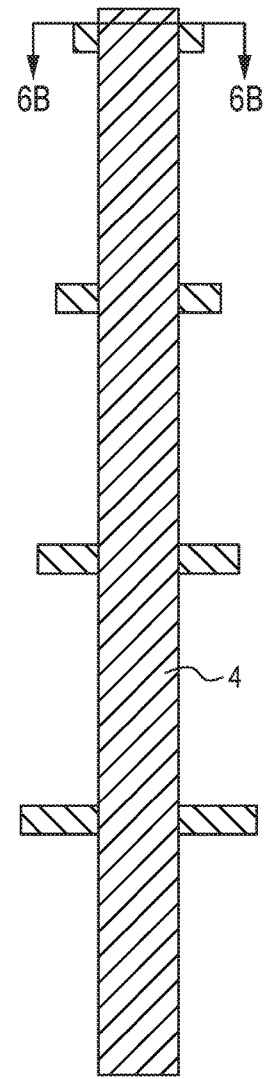
FIG. 6A shows a front view of how eight, prior art, 1/4"×12" wedge shims are used in overlapping pairs, each of which is slid into the opposing sides of the gap, at four different heights up from the floor, to shim the door jam.
Figure 6B:
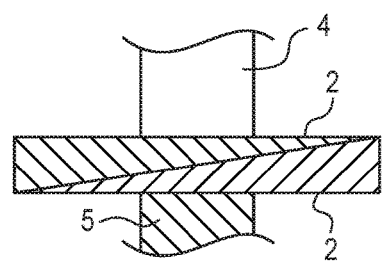
FIG. 6B shows a top view of the shimming arrangement of FIG. 6A and reveals that the top face of the upper shim of the pair is held such that it fully aligns with and contacts the door jam and thereby avoids the twisting problem with the arrangement shown in FIGS. 5A-5B.

To remedy this instability and twisting problem, it is recommended that two, overlapped shims be used at each location above the floor where it is desired to shim the door jam. This situation is shown in FIG. 6A, a front view, and FIG. 6B, a top view. At each shimming location, a shim is slide into the gap from both the right and the left sides of the door jam so that they overlap for whatever distance is required to achieve a specific overlapped shim height or gap depth. Since the greatest depth of the gap is at the top of the door jam and the smallest depth of the gap is at the bottom of the door jam—the greatest amount of shim overlap to fill the greater gap depth and the least length of the wedge shims that extend from each side of the door jam is at the top of the door jam, and the least amount of shim overlap and the greatest length of the wedge shims that extend from each side of the door jam is near the floor—see FIG. 6A. It should be noted that eight wedge shims are needed for this installation.

Figure 7A:
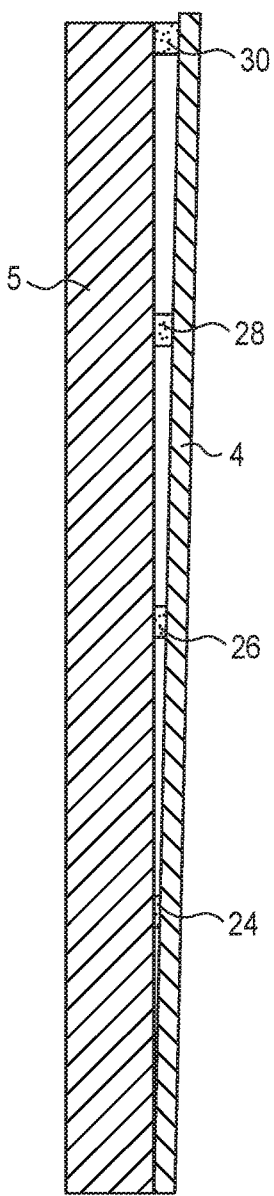
FIG. 7A shows a side view of the shimming application of FIG. 4 where a single "step shim" has been broken into four, different height member segments and these used to shim the door jam at four different heights up from the floor.
Figure 7B:
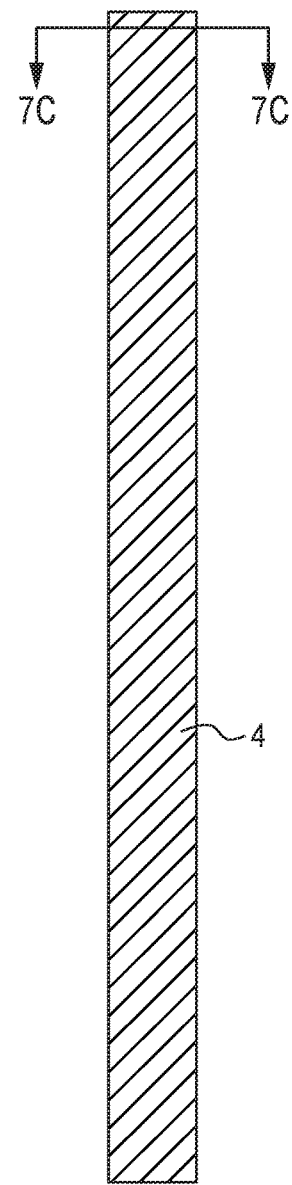
FIG. 7B shows a front view of the shimming application of FIG. 7A where it can be seen the lengths of the "step shim's" member segments are such that, when they are placed in the gap, neither of the ends of these member segments extend beyond this 3.5" wide door jam.
Figure 7C:
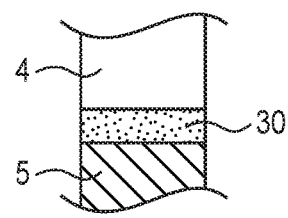
FIG. 7C shows a top view of the shimming arrangement of FIGS. 7A-7B and reveals that the "step shim's" top face fully aligns with and contacts the door jam.

These wedge shim, door jam installations should be compared with that achieved by using the step shim of the present invention and which results in a quicker and easier installation that uses only a single step shim—see FIGS. 7A-7C. FIG. 7A shows a side view of the gap and the location of the various segments 24, 26, 28, 30 of this step shim 1 after they have been broken apart and installed in the gap at various distances or elevations up from the bottom of the door jam. Note, from the top view FIG. 7C, that the ends of the various segments are even with the edges of the 2×4 stud since the length of these segments was specifically set to be 3.5" (the assumed width of the door jam and the width of a 2×4 stud). FIG. 7B shows the front view of this installation and again shows that the length of the step shim's segments has been set so as to avoid any part of a segment extending beyond the edges of a 2×4 stud or, in this instance, a 3.5" wide door jam. This eliminates the need at this point in the installation for any additional wedge scoring and the breaking off of any beyond-the-gap extending piece of a shim.

The method of utilizing the step shim is also different from that of the wedge shim. With a wedge shim, an installer can utilize a shim at any point and therefore any gap depth—one just slides the wedge shim further under the fixture that is to be shimmed until a portion of the shim's top face makes contact with the fixture.

However, with a 4-segment, step shim which has four discrete and different heights, the installer utilizes each segment at only one specific location—i.e., where the gap's depth (i.e., the approximate perpendicular distance between the adjoining flat boundary surface of a fixture that is to be attached to the flat boundary surface os a support structure) is exactly equal to that of the height of a specific one of the step shim's four segments. To find these exact location, the installer just slides the segment of the step shim, that the installer current wants to utilize, perpendicularly into the front of the gap at a point where the gap's depth is at its largest and then slides this segment towards that end of the gap where the gap's depth is diminishing—when this segment wedges itself into the gap, the proper location for the placement of the segment has been found. The installer then fully extends this member section into the gap until the boundary line on its rear edge aligns with the gap's open front and breaks off along this boundary line that portion of the step shim that has not been inserted into the gap and extend outside of the gap.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereafter set forth in the claims to the invention.

I claim:

1. A "step shim" that yields a plurality of individual shims that are used for positioning a fixture with a planar, mounting surface in a precise location relative to an adjoining support structure that has a planar, front face with two ends and to which said mounting surface of said fixture is to be attached, and wherein a gap exists between said mounting surface of said fixture and said front face of said support structure and wherein said gap having a depth that various in magnitude at the various points that lie between said two ends of said support structure, said step shim comprising:

an elongated, rectangular member having two, parallel side surfaces for which the distance between said side surfaces defines the uniform width of said member, a flat, bottom face and a top face that includes a plurality of rectangular, flat, adjoining segments, each of which is separated from an adjoining top face segment by a boundary line that extends across said top face and perpendicularly between said parallel side surfaces and wherein, for each of said segments, the perpendicular distance between said bottom face and the segment of the above top face defines the height of said segment and which is uniform within any said segment, and front and back, parallel ends for which the distance between said ends defines the length of said member and wherein the longitudinal centerline of said member extends between said ends, wherein said elongated, rectangular member having a configuration adapted to allow said elongated member to be broken apart along said boundary lines into a plurality of member segments that each correspond to one of said top face segments and wherein each of said member segments has a different, uniform height and is configured to be used as one of said plurality of individual shims, and wherein the uniform height of any member segment is: (a) less than that of the height of the adjoining member segment that is closest to said back end of said member, (b) greater than that of the height of the adjoining member segment that is closest to the front end of said member, and (c) chosen so that said member segment will fit within and permanently fill said gap, with one of said faces of said member segment being proximate said mounting surface of said fixture when and said other face of said member segment is proximate said front face of said adjoining support structure, at a location within said gap of one of said points between said two ends of said planar front face of said support structure.

2. The "step shim" as recited in claim 1, wherein:
said member configuration includes a plurality of straight line, scoring indents of a prescribed depth into the bottom face of said member and wherein each of said scoring indents extends perpendicularly to said side surfaces of said member and is located below a boundary line in said top face of said member.

3. The "step shim" as recited in claim 2, wherein:
said member has a width in the range of 1-2.5 inches.

4. The "step shim" as recited in claim 3, wherein:
each of said member segments from the front end to the back end of said member has a respective height of 1/16 inch, 1/8 inch, 3/16 inch and 1/4 inches.

5. The "step shim" as recited in claim 4, wherein:
said member having four member segments, each with an equal member segment length of 3.5 inches.

6. The "step shim" as recited in claim 2, wherein:
each of said member segments from the front end to the back end of said member has a respective height of 1/16 inch, 1/8 inch, 3/16 inch and 1/4 inches.

7. The "step shim" as recited in claim 1, wherein:
said member has a width in the range of 1-2.5 inches.

8. The "step shim" as recited in claim 1, wherein:
each of said member segments from the front end to the back end of said member has a respective height of 1/16 inch, 1/8 inch, 3/16 inch and 1/4 inches.

9. The "step shim" as recited in claim 8, wherein:
said member having four member segments, each with an equal member segment length of 3.5 inches.

10. The "step shim" as recited in claim 8, wherein:
said member having four member segments, each with an equal member segment length of 3.5 inches.

11. A method for utilizing a "step shim" that yields a plurality of individual shims that are used for positioning a fixture with a planar, mounting surface in a precise location relative to an adjoining support structure that has a planar, front face with two ends and to which said mounting surface of said fixture is to be attached, and wherein a gap exists between said mounting surface of said fixture and said front face of said support structure and wherein said gap having a depth that various in magnitude at the various points that lie between said two ends of said support structure, said method comprising the step of:

wherein said "step shim" including:
an elongated, rectangular member having two, parallel side surfaces for which the distance between said side surfaces defines the uniform width of said member, a flat, bottom face and a top face that includes a plurality of rectangular, flat, adjoining segments, each of which is separated from an adjoining top face segment by a boundary line that extends across said top face and perpendicularly between said parallel side surfaces and wherein, for each of said segments, the perpendicular distance between said bottom face and the segment of the above top face defines the height of said segments and which is uniform within any said segment, and front and back, parallel ends for which the distance between said ends defines the length of said member and wherein the longitudinal centerline of said member extends between said ends, wherein said elongated, rectangular member having a configuration adapted to allow said elongated member to be broken apart along said boundary lines into a plurality of member segments that each correspond to one of said top face segments and wherein each of said member segments has a different, uniform height and is configured to be used as one of said plurality of individual shims, and wherein the uniform height of any member segment is: (a) less than that of the height of the adjoining member segment that is closest to said back end of said member, and (b) greater than that of the height of the adjoining member segment that is closest to the front end of said member, placing one of said member segments into said gap at a location where said height of said member segment is equivalent to the depth of said gap, extending said member segment perpendicularly inwardly into said gap for a distance that is equivalent to the length of said member section, and breaking off said member segment that was extended into said gap from the remainder of said elongated, rectangular member along said boundary line that separates said member segment that was extended into said gap from the remainder of said elongated, rectangular member.

* * * * *